United States Patent [19]

Mathers et al.

[11] Patent Number: 5,917,652
[45] Date of Patent: Jun. 29, 1999

[54] DURABLE RETROREFLECTIVE ELEMENTS

[75] Inventors: James P. Mathers; Kathleen M. Humpal, both of Woodbury; Roger W. Lange, Maplewood, all of Minn.

[73] Assignee: Minnesota Mining and Manufacturing Company, St. Paul, Minn.

[21] Appl. No.: 09/033,295

[22] Filed: Mar. 2, 1998

Related U.S. Application Data

[62] Division of application No. 08/591,570, Feb. 5, 1996, Pat. No. 5,774,265.

[51] Int. Cl.⁶ .................................................. G02B 5/126
[52] U.S. Cl. ........................ 359/534; 359/536; 359/542; 359/900; 427/422; 427/452; 427/453
[58] Field of Search ..................................... 359/515–553, 359/900; 264/1.1, 1.9; 427/180, 196, 422, 426, 452, 453, 455, 456

[56] References Cited

U.S. PATENT DOCUMENTS 5,822,120   10/1998   Palazzotto et al. ..................... 359/536

*Primary Examiner*—James Phan
*Attorney, Agent, or Firm*—Lisa M. Fagan

[57] ABSTRACT

All-ceramic retroreflective elements which may be used in pavement markings comprising an opacified ceramic core and ceramic optical elements partially embedded into the core.

2 Claims, 1 Drawing Sheet

DURABLE RETROREFLECTIVE ELEMENTS

This is a division of application Ser. No. 08/591,570, filed Feb. 5, 1996, U.S. Pat. No. 5,774,265.

FIELD OF THE INVENTION

The present invention relates to retroreflective elements such as can be placed in pavement markings to guide and direct motorists traveling on a roadway.

BACKGROUND OF THE INVENTION

The use of pavement markings (e.g., paints, tapes, and individually mounted articles) to guide and direct motorists traveling along a roadway is well known. During the daytime the markings may be sufficiently visible under ambient light to effectively signal and guide a motorist. At night, however, especially when the primary source of illumination is the motorist's vehicle headlights, the markings are generally insufficient to adequately guide a motorist because the light from the headlight hits the pavement and marking at a very low angle of incidence and is largely reflected away from the motorist. For this reason, improved pavement markings with retroreflective properties have been employed.

Retroreflection describes the mechanism where light incident on a surface is reflected so that much of the incident beam is directed back towards its source. The most common retroreflective pavement markings, such as lane lines on roadways, are made by dropping transparent glass or ceramic optical elements onto a freshly painted line such that the optical elements become partially embedded therein. The transparent optical elements each act as a spherical lens and thus, the incident light passes through the optical elements to the base paint or sheet striking pigment particles therein. The pigment particles scatter the light redirecting a portion of the light back into the optical element such that a portion is then redirected back towards the light source.

In addition to providing the desired optical effects, pavement markings must withstand road traffic and weathering, adverse weather conditions, and cost constraints.

Vertical surfaces provide better orientation for retroreflection; therefore, numerous attempts have been made to incorporate vertical surfaces in pavement markings, typically by providing protrusions in the marking surface. In addition, vertical surfaces may prevent the build-up of a layer of water over the retroreflective surface during rainy weather which otherwise interferes with the retroreflection mechanism.

One means of providing vertical surfaces is to place raised pavement markers at intervals along a pavement marking line (e.g., U.S. Pat. Nos. 3,292,507; 4,875,798). These markers are relatively large, generally several centimeters in width and 5 to 20 millimeters in height. Typically, the markers require assembling together different components, some of which were previously individually molded or casted. Therefore, the markers are relatively expensive to manufacture. The size of the markers subjects them to substantial impact forces from passing vehicles. As a result, the markers must be substantially secured to the pavement, increasing the installation costs and removal costs when they wear out. Moreover, because the markers are applied at intervals, the bright spots of light are discontinuous, rather than the desired continuous bright line.

Embossed pavement marking tapes are a second means of providing vertical surfaces (e.g., U.S. Pat. Nos. 4,388,359, 4,069,281, and 5,417,515). Selective placement of transparent optical elements on the vertical sides of the embossed protrusions results in a highly effective marking material. However, such tapes are relatively expensive compared to conventional painted markings, and thus their use is often limited to critical areas such as unlighted intersections and railway crossings. Also, these embossed tapes are constructed with polymeric materials which are susceptible to wear.

A third means of providing vertical surfaces for retroreflection is a composite retroreflective element or aggregate (e.g., U.S. Pat. Nos. 3,254,563, 4,983,458). Many variations are known, but the retroreflective elements essentially have a core with optical elements embedded in the core surface. Some known embodiments also contain optical elements dispersed throughout the core. The core may be irregular in shape or may be shaped into spheres, tetrahedrons, discs, square tiles, etc. Retroreflective elements are advantageous because they can be embedded into inexpensive painted markings.

Retroreflective elements are largely comprised of polymeric cores or binders. A pigmented core or binder often serves as a diffuse reflector. This arrangement allows spherical optical elements to be used on either horizontal or vertical surfaces. Other constructions have transparent optical elements comprising a specular reflector such as metallic silver. The metallic surface directs light back towards the source and a pigmented core is not necessary. Because of the geometry of the optics, a specular coated optical element would not be as effective if embedded in a pavement marking paint (a horizontal surface), and would be more highly effective if embedded in the vertical surfaces of a retroreflective element.

Another retroreflective element construction, U.S. Pat. No. 3,252,376, only has silvered glass flakes serving as a specular reflector on the surface of a spherical polymeric core without the use of spherical optical elements.

Another known construction is a retroreflective element where a plastic globule (lens) refracts incident light onto a layer of glass optical elements attached to the bottom portion of the globule. The glass optical elements then focus the light onto a specular coating or film located below the optical elements, where the light is then reflected back along the original path towards the source (e.g., U.S. Pat. Nos. 4,072,403; 4,652,172; 5,268,789).

Shaped polymeric retroreflective elements with a pigmented core and glass optical elements embedded in the vertical surfaces are disclosed in U.S. Pat. No. 3,418,896. These retroreflective elements are formed by extruding the pigmented polymer into rods of different cross-sectional shape. Glass optical elements are embedded into the surface of the polymer before it hardens, then the rods are sliced to form the desired elements.

Although optical requirements can be achieved when using polymeric cores in combination with specular reflectors, additional costs are incurred. Deposition and etching operations often used to produce specular films involve the use of hazardous chemicals which increases the cost of the retroreflective element. Retroreflective elements with metallic specular reflectors are highly efficient at night, but produce a gray appearance when viewed during daylight hours which detracts from the visibility of the marking paint. Additionally, some metals commonly used to produce specular reflection, such as aluminum, are subject to corrosion.

Polymeric retroreflective elements are undesirably susceptible to wear, especially in high traffic regions, and to degradation due to weathering. In an attempt to overcome these limitations, retroreflective elements were constructed having a ceramic core and glass optical elements with a metallic specular coating.

One type of construction is a rock or glass sphere core (U.S. Pat. Nos. 3,043,196 and 3,175,935) covered by a polymeric binder with glass optical elements having a specular metallic coating embedded in the polymeric coating.

Another construction disclosed in U.S. Pat. No. 3,556,637 has a glass sphere and a layer of glass optical elements attached to the bottom of the glass sphere with a polymeric binder. A metallic film below the glass optical elements acts as a specular reflector.

Other known constructions include a composite lens element serving both as a retroreflective element and an skid-resistant particle (EP 0,322,671). The skid-resistant particle which acts as a core (either a corundum particle or glass sphere) is coated with a pigmented polymeric binder which acts as a diffuse reflector.

A ceramic retroreflective element having a transparent glass sphere with smaller glass optical elements embedded into the surface is disclosed in U.S. Pat. Nos. 3,274,888 and 3,486,952. A thin metallic film separates the optical elements and the glass sphere to provide an efficient specular retroreflective system. The elements are formed by first coating the glass spheres with metallized optical elements using a temporary polymeric binder. The coated spheres are then tumbled with excess optical elements in a rotary kiln. When the temperature exceeds the softening temperature of the glass spheres, the optical elements embed themselves into the surface of the spheres. Later the film is etched away from the exposed portion of the optical elements.

These ceramic retroreflective element constructions contain either metallic specular reflectors which are susceptible to corrosion and additional processing costs, as discussed above, or polymeric binders which exhibit lower resistance to weathering and wear than is sometimes desired.

SUMMARY OF THE INVENTION

The present invention provides an all-ceramic retroreflective element, which may be used in pavement markings, with greatly improved resistance to wear and the effects of weathering. This retroreflective element is comprised of an opacified ceramic core and ceramic optical elements partially embedded into the core. The retroreflective element may be irregular in shape or in the form of a sphere, disc, tile, etc. The diffuse reflecting ceramic core, in combination with the transparent optical elements embedded in the surface, provides a surprisingly bright retroreflective element without the gray coloration and the susceptibility to corrosion associated with metallic specular reflectors. Moreover, the composite elements of the present invention are inexpensive to manufacture and install.

Other embodiments of the present invention include methods of preparing and shaping the ceramic core, as well as methods of embedding the optical elements into the core, and methods of selectively embedding optical elements in the vertical surfaces of the core.

Figure 1:
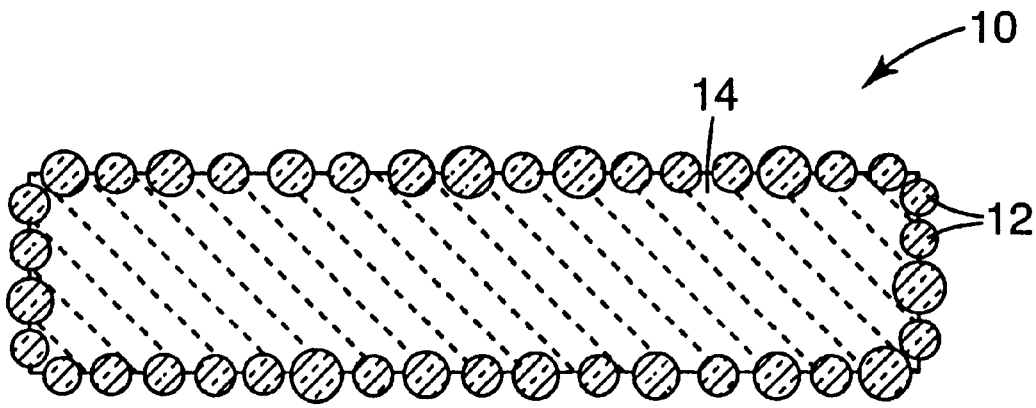
FIG. 1 is a cross-sectional view of the retroreflective element 10 where optical elements 12 are embedded in the surface of the ceramic core 14.
Figure 2:
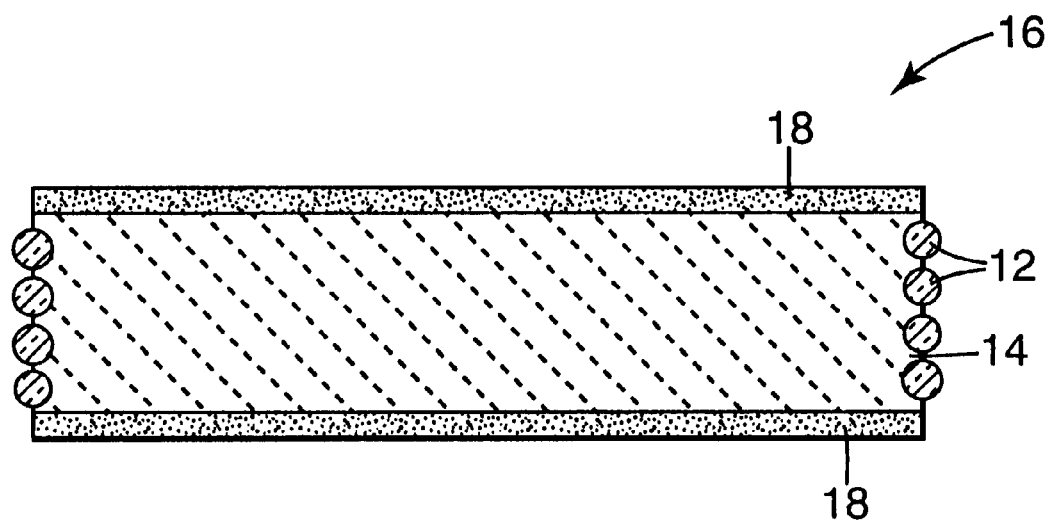
FIG. 2 is a cross-sectional view of a retroreflective element 16 with selectively placed optical elements. A barrier layer of powder 18 is coated on two surfaces of the ceramic core 14 and optical elements 12 are embedded in the non-coated remaining surfaces of the ceramic core.

The FIGS., which are idealized and not to scale, are intended to be merely illustrative and non-limiting.

DETAILED DESCRIPTION OF ILLUSTRATIVE EMBODIMENTS

The present invention provides shaped all-ceramic retroreflective elements particularly useful in imparting retroreflection to liquid pavement marking and methods of forming them. An all-ceramic retroreflective element is bonded together in final form without the aid of polymeric materials, although polymers may be used as temporary binders in the manufacturing process. These retroreflective elements are free of metals and polymeric material. The retroreflective elements are comprised of a layer of ceramic optical elements, such as transparent ceramic microspheres, partially embedded in the surface of an opacified, diffusely reflecting, ceramic core such that some of the light incident to the exposed surface of the optical elements is refracted thereby into the core where some of it is reflected so as to re-enter the embedded portion of the optical element, and be refracted such that it exits the exposed portion of the optical element in a direction generally toward the light source. "Ceramic" is used herein to refer to inorganic materials which can be either crystalline (a material having a patterned atomic structure sufficient to produce a characteristic x-ray diffraction pattern) or amorphous (a material having no long range order in its atomic structure evidenced by the lack of a characteristic x-ray diffraction pattern). Amorphous ceramics are more commonly known as glasses. The opacified ceramic cores of this invention will often contain a mixture of amorphous (glass) and crystalline phases.

Optical Elements

A wide variety of ceramic optical elements may be employed in the present invention. Typically, for optimal retroreflective effect, the optical elements have a refractive index of about 1.5 to about 2.6. The optical elements preferably have a diameter compatible with the size, shape, and geometry of the core. The presently preferred core dimensions range from about 0.5 to about 5 millimeters in height and about 2 to about 10 millimeters in width. Generally, optical elements of about 50 to about 1000 micrometers in diameter may be suitably employed. Preferably, the ratio of the diameter of the optical elements to the core edge height is no greater than about 1:2. Preferably, the optical elements used have a relatively narrow size distribution for effective coating and optical efficiency.

The optical elements comprise an amorphous phase, a crystalline phase, or a combination, as desired. The optical elements preferably are comprised of inorganic materials that are not readily susceptible to abrasion. Suitable optical elements include microspheres formed of glass, preferably having indices of refraction of from about 1.5 to about 1.9. The optical elements most widely used are made of soda-lime-silicate glasses. Although the durability is acceptable, the refractive index is only about 1.5, which greatly limits their retroreflective brightness. Higher-index glass optical elements of improved durability that can be used herein are taught in U.S. Pat. No. 4,367,919.

Preferably, when glass optical elements are used, the fabrication of the retroreflective element occurs at temperatures below the softening temperature of the glass optical elements, so that the optical elements do not lose their shape or otherwise degrade. The optical elements' softening temperature, or the temperature at which the glass flows, generally should be at least about 100° C., preferably about 200° C., above the process temperature used to form the retroreflective element.

Further improvements in durability and refractive index have been obtained using microcrystalline ceramic optical elements as disclosed in U.S. Pat. Nos. 3,709,706; 4,166,147; 4,564,556; 4,758,469 and 4,772,511. Preferred ceramic optical elements are disclosed in U.S. Pat. Nos. 4,564,556 and 4,758,469, which are incorporated herein by reference in their entirety. These optical elements comprise at least one crystalline phase containing at least one metal oxide. These ceramic optical elements also may have an amorphous phase such as silica. The optical elements are resistant to scratching and chipping, are relatively hard (above 700 Knoop hardness), and are made to have a relatively high index of refraction.

The optical elements may comprise zirconia, alumina, silica, titania, and mixtures thereof.

When optical elements having a crystalline phase are used, the retroreflective element fabrication temperature preferably does not exceed the temperature at which crystal growth occurs in the crystalline component of the optical elements, otherwise the optical elements may deform or lose their transparency. The transparency of the optical elements depends in part on maintaining the crystal size below the size at which they begin to scatter visible light. Generally, the process temperature used to form the retroreflective element is limited to about 1100° C., and preferably to less than 1050° C. Higher process temperatures may cause the optical elements to cloud with a corresponding loss in retroreflective effectiveness.

The optical elements can be colored to match the marking paints in which they are embedded. Techniques to prepare colored ceramic optical elements that can be used herein are described in U.S. Pat. No. 4,564,556. Colorants such as ferric nitrate (for red or orange) may be added in the amount of about 1 to about 5 weight percent of the total metal oxide present. Color may also be imparted by the interaction of two colorless compounds under certain processing conditions (e.g., $TiO_2$ and $ZrO_2$ may interact to produce a yellow color).

Core Materials

The diffuse reflection exhibited by the core material is an important factor in determining the retroreflective performance of a retroreflective element of the invention. A convenient means of characterizing diffuse reflection is described in ANSI Standard pH2.17-1985. This technique is often used to characterize the diffuse reflection from photographic images, however, it is also applicable to other materials. The value measured is the reflectance factor which compares the diffuse reflection from a sample, at specific angles, to that from a standard calibrated to a perfect diffuse reflecting material.

A useful test for characterizing the retroreflective performance of retroreflective elements is described in ASTM Standard E 809-94a, Standard Practice for Measuring Photometric Characteristics of Retroreflectors. Procedure B of the standard describes procedures for measuring the coefficient of retroreflection ($R_A$) using small sample sizes and small instruments. A photometer suitable for these measurements is described in U.S. Defensive Publication No. T987,003.

A strong correlation has been found between $R_A$ and the reflectance factor of the core material. This correlation is demonstrated in Example 12, where core materials with higher reflectance factors are shown to provide significantly higher values of $R_A$. A reflectance factor of at least 75% at a thickness of 500 micrometers is preferred to provide a retroreflective element with adequate brightness for highway marking. More preferably, the core has a reflectance factor of at least 85% at a thickness of 500 micrometers.

Diffuse reflection in a ceramic material is caused by light scattering within the material. Such light scattering may be due to the presence of pores or the presence of crystalline phases having different refractive indices. The size of the pores or the crystalline phases ranges from about 0.05 micrometer to about 1.0 micrometers. Preferably, the size ranges from about 0.1 micrometer to about 0.5 micrometers. The scattering power is maximized when the size of pores or the second phase is slightly less than one-half the wavelength of the incident light, about 0.2 to about 0.4 micrometers.

The degree of light scattering is also increased when there is a large difference in the refractive index of the scattering phase or pore and the phase in which it is dispersed. An increase in light scattering is observed typically when the difference in refractive index is greater than about 0.1. Preferably, the refractive index difference is greater than about 0.4. Most preferably, the difference is greater than about 0.8.

For the materials of the present invention, light scattering is due to a combination of scattering from pores and from various crystalline phases.

Glass is an attractive core material because it can be processed at low temperatures and thus at a lower cost. However, glasses tend to be fully dense, single phase materials which do not provide the light scattering desired for use as core materials in accordance with the invention. A special class of ceramics containing both glass phases and crystalline phases are known to provide excellent scattering. These materials are known as opaque glazes when applied as a coating on a ceramic and as opaque porcelain enamels when applied as a coating on a metal. Because opaque glazes and opaque porcelain enamels contain a large portion of glass, they are often referred to as opacified glasses.

Silicates having a refractive index typically in the range of about 1.5 to about 1.6 are used in both opaque glazes and opaque porcelain enamels. To obtain an adequate difference in refractive index, a scattering phase with a high refractive index is desirable for use in the opacified glass. Materials (opacifiers) which are commonly used for this purpose include tin oxide ($SnO_2$) with a refractive index of about 2.04; zircon ($ZrSiO_4$) with a refractive index of about 1.9 to about 2.05; calcium titanate ($CaTiO_3$) with a refractive index of about 2.35; and titania ($TiO_2$), anatase and rutile, with a refractive index of about 2.5 to about 2.7.

Other illustrative opacifying agents suitable for use herein include, but are not limited to, $CaTiOSiO_4$ (refractive index of about 1.95 to about 2.09); $Ca_3Ti_2O_7$ (refractive index of about 2.16 to about 2.22); $Na_2Ti_2Si_2O_9$ (refractive index of about 1.91 to about 2.02); $BaTiO_3$ (refractive index of about 2.4); $MgTi_2O_5$ (refractive index of about 2.11 to about 2.23); and $MgTiO_3$ (refractive index of about 1.95 to about 2.3).

Preferably, the crystalline phase required for sufficient light scattering, and thus, opacity, is achieved by dissolving the opacifier in the molten glass and then allowing it to precipitate from the glass during cooling. However, in some cases, the opacifier may not dissolve in the glass, and may be added to the glass as a separate component. Most titania opacified glasses contain 15 to 20 weight percent titania which is largely in solution at temperatures where the porcelain enamel is fired, typically greater than about 700° C. The titania precipitates on cooling into crystals, typically 0.2 micrometers in size. Zircon has a solubility in many glasses of about 5 weight percent at 1200° C. The customary amount of zircon in the glaze is 8 to 10 weight percent, so while much of the zircon is precipitated from the glass, some of the zircon remains undissolved in the molten glass. Therefore, the zircon raw material used in the glaze preferably is milled to a fine crystal size (i.e., typically ranging from about 0.05 micrometer to about 1.0 micrometer) before addition to the glass formulation.

Many variations of titania and zircon opacified glasses are sold commercially. Glass and opacifier are available as a homogeneous single material (i.e., the manufacturer has blended and heated the ingredients together to form a melt and then cooled and ground the resulting material which is then sold as a flake or a powder, known as a frit). The glass frit and the opacifier powder may also both be obtained separately and then combined in the manufacturing process. Zirconia ($ZrO_2$) may also be used as an opacifying additive. In this case, the zirconia often reacts with silica in the base glass to form zircon. If desired, additional opacifier can be added to an opacified frit. For example, additional zircon powder can be added to a zircon opacified glass frit. When opacifiers are used in this fashion, powders in the size range of 0.05 to 1 micrometer are particularly useful. This size assists in complete solution of the powder in the glass, or in cases where the glass is already saturated with the opacifier, insures that the undissolved material is in the desired size range for scattering. Preferably, during the manufacturing process, the powdered opacifier and the glass powder are completely and uniformly mixed. Complete mixing is preferred to avoid agglomeration of any of the components. Typically, as known in the art, by proper mixing and by the use of dispersants, agglomeration can be avoided.

The use of titania and zircon opacified glasses in glazes and porcelain enamels as thin coatings is well known. Surprisingly, these materials may also be used in structural applications, in particular as retroreflective elements which withstand roadway traffic, even at relatively large sizes (up to at least 2 cm).

Preferably, the core material should not react with or solubilize the optical elements, as this tends to reduce transparency and can distort the optical element shape. Low melting glass compositions are known to be especially reactive and to be good solvents for oxides. Therefore, it is surprising that the ceramic optical elements are not degraded when processed with the low softening temperature titania and zircon opacified glasses.

Glass-ceramics are also useful as a core material because they contain a scattering phase. Glass-ceramics are glasses which can be crystallized through the use of controlled heat-treatments and/or nucleating agents to produce a material which is substantially crystalline in its final form. The crystalline materials act as scattering centers; and therefore, the glass-ceramics may have an opaque appearance.

Illustrative examples of glass-ceramics which can be densified at temperatures that do not degrade the transparency of the optical elements and which form a strong bond with the optical elements include systems comprising $MgO-Al_2O_3-SiO_2$ (magnesium based), in particular cordierite; $Li_2O-Al_2O_2-SiO_2$ (lithium based), and $ZnO-Al_2O_3-SiO_2$ (zinc oxide based). The tables below provide the compositions in weight percent of illustrative examples of each class of glass-ceramic.

TABLE 1

| $MgO-Al_2O_3-SiO$, Based | | |
|---|---|---|
| $SiO_2$ | 44–55 | 41.7 |
| $Al_2O_3$ | 20–30 | 23.5 |
| MgO | 20–30 | 21.7 |
| $B_2O_3$ | 1–10 | 0.0 |
| $TiO_2$ | 0 | 13.2 |

TABLE 2

| $Li_2O-Al_2O_3-SiO_2$ Based | | |
|---|---|---|
| $SiO_2$ | 64.7 | 55.9 | 63.7 |
| $Al_2O_3$ | 7.7 | 18.9 | 12.1 |
| $Li_2O$ | 12.9 | 22.2 | 3.1 |
| $TiO_2$ | 0 | 0 | 13.8 |
| CaO | 0 | 0 | 3.4 |
| MgO | 11.7 | 0 | 3.9 |
| $P_2O_5$ | 3.0 | 3.0 | 0 |

TABLE 3

| $ZnO-Al_2O_3-SiO_2$ Based | |
|---|---|
| $SiO_2$ | 58.2 |
| $Al_2O_3$ | 14.6 |
| $TiO_2$ | 2.9 |
| ZnO | 24.3 |

Preferably the optical elements are embedded to a depth sufficient to hold the optical elements in the core during processing and use. For spheroidal optical elements, embedment greater than 30% of the diameter typically will effectively hold the optical element into the core. The degree of mechanical or chemical bonding can also influence the embedment depth. Mechanical bonding is thought to be due to the compressive stress exerted by the core on the optical element due to the difference in the coefficient of thermal expansion. When the core has a higher coefficient of thermal expansion than the optical element, it will contract more than the optical element upon cooling during processing. In this case, the core will exert a compressive stress on the optical element which will contribute to the mechanical bonding.

A chemical bond thought to be formed by inter-diffuision between the optical elements and the core during fabrication of the retroreflective elements may also contribute to the bonding. Inter-diffusion is desirable provided it does not significantly alter the transparency or shape of the optical element so as to interfere undesirably with the retroreflective mechanism.

The optical elements embedded in the opacified glass cores exhibit a highly desirable degree of bonding in the cores. The optical elements, when embedded to more than about 30% of their diameter, are difficult to remove (for example with a dental pick) without breaking.

Optional Additives

Other materials may be included within the retroreflective elements of the present invention. These may be materials added to the core material during preparation, added to the core material by the supplier, and/or added to the retroreflective elements during coating with the optical elements. Illustrative examples of such materials include pigments, skid-resistant particles, particles which enhance the mechanical bonding between the retroreflective element and the binder, and a fluxing agent.

Pigments may be added to the core material to produce a colored retroreflective element, in particular yellow may be desirable for yellow pavement markings. For example, praseodymium doped zircon ((Zr, Pr)SiO$_4$) and Fe$_2$O$_3$ or NiO in combination with TiO$_2$ may be added to provide a yellow color to better match aesthetically a yellow liquid pavement marking often used in centerlines. Cobalt zinc silicate ((Co, Zn)$_2$SiO$_4$) may be added to match a blue colored marking. Colored glazes or porcelain enamels may also be purchased commercially to impart color, for example yellow or blue.

Pigments which enhance the optical behavior may be added. For example, when neodymium oxide (Nd$_2$O$_3$) or neodymium titanate (Nd$_2$TiO$_5$) is added, the perceived color depends on the spectrum of the illuminating light.

Skid-resistant particles may be substituted for some of the optical elements on the surface of the elements, particularly on the upper and lower surfaces. They are useful on retroreflective and non-retroreflective pavement markings to reduce slipping by pedestrians, bicycles, and motor vehicles. The skid-resistant particles can be, for example, ceramics such as quartz, aluminum oxide, silicon carbide or other abrasive media. Preferred skid-resistant particles include fired ceramic spheroids having a high alumina content as taught in U.S. Pat. Nos. 4,937,127; 5,053,253; 5,094,902; and 5,124,178, the disclosures of which are incorporated herein by reference. Skid-resistant particles typically have sizes ranging from about 200 to about 800 micrometers.

Fluxing agents may be used to enhance the embedding of the optical elements in the core by lowering the softening temperature of the glass at the surface. Illustrative examples include compounds or precursors for B$_2$O$_3$ (boric oxide), Na$_2$O (sodium oxide), and K$_2$O (potassium oxide).

In one embodiment of the retroreflective element, the core is comprised of a thin layer of opacified glass about a central portion of the core.

Processes

The presently preferred embodiments have cores consisting of opacified glass such as zircon opacified glasses and titania opacified glasses. These opacified glasses are sold commercially as frits in the form of powders or flakes. The frit flakes are typically about 1 mm in thickness and have widths ranging from about 2 to about 10 mm and can be milled further into smaller flakes or powders. Frit powders are typically available as –200 mesh (particle size ranging from about 1 to about 75 micrometers in size).

Frit flakes can be conveniently used as a core material for the retroreflective element. These flakes are buried in a bed of ceramic optical elements and then heated above the softening temperature of the flakes. At this point, the flakes become sufficiently softened so that the ceramic optical elements may embed into the surface of the frit flakes. Typically, a static bed (i.e., a bed in which the optical elements are not agitated) is desirable to aid in maintaining the core shape.

Preferably, the frit flakes are buried under about 3 millimeters of optical elements, so that they embed to the desired depth (about 30 to about 80 percent of their average diameter). This tends to prevent the coalescence of frit flakes into spheroidal shapes. More preferably, the optical elements are embedded to a depth of about 40% to about 60% of their average diameter. If the optical elements are embedded to a depth less than about 30% of their diameter they tend to readily dislodge from the retroreflective element surface. When the embedded depth exceeds 80%, the amount of light able to access the optical element is undesirably restricted.

After firing (i.e., heat-treatment applied to a ceramic to consolidate or density a ceramic, or alter its condition in some other manner) the ‚fakes retain their original shape except for some rounding of corners and rough edges. The retroreflective elements are much stronger than the original frit flakes. The frit flakes can be broken by hand and the fired retroreflective elements cannot. This increase in strength is believed to be due to healing of the thermal stress cracks in the raw frit after the glass is heated above its softening temperature.

Disc pelletization is a preferred method for obtaining spherical cores. Disc pelletization is a balling process where the frit powder is fed into a rotating pan inclined at an angle to horizontal. As the pan rotates, a mixture of water and a temporary organic binder is sprayed over the powder causing the powder to agglomerate into spheroids which grow in size as additional powder is fed into the pelletizer. When dried, the spheres are heated in a bed of optical elements and fired as described earlier for the frit flakes. The particles of frit powder will fuse together above the softening temperature of the glass and the optical elements surrounding the shaped core will embed themselves into the core. The heating rate must be sufficiently slow to allow any volatiles (e.g., water, organic binders) to be eliminated before the frit fuses, otherwise large voids or bubbles may form in the core.

A wide variety of retroreflective element shapes are possible when powdered frits are used as a raw material and processed with techniques known in the art for shaping clay/water pastes.

A difficulty which must be overcome, however, is the non-plastic behavior of the frit powder in water-based pastes. Pastes are solid-liquid mixtures which exhibit plastic behavior. A plastic material can be deformed under mechanical stress without fracture and will retain the deformed shape when the stress is removed. The plastic behavior of clay-water pastes is derived from the plate-like morphology and small size of the clay particles, typically about 0.1 micrometer thick with a width of about 1 micrometer. Deformation is possible because water is strongly held in the small voids between the particles and serves as a lubricant. Also, the plate-like particles can change orientation under stress to slide past each other. In a coarse powder, like the glass frits, water can easily drain from the larger voids under pressure, leaving a stiff cake which cannot be deformed without fracture. To overcome this problem, high molecular weight polymers are added to the water. These polymers raise the viscosity of the water phase making it more difficult to drain the water from the interparticle voids under pressure. A polymer commonly used to increase the plasticity of a non-clay paste is methylcellulose (a water soluble polymer). Addition of about 2 to about 15 weight percent to the water component is generally effective. The plastically deformable paste is then formed into a core of desired shape. For example, a plasticized frit-water paste can be extruded into columns of circular or square cross-section, and then cut into thin discs or square tiles. Alternately, the paste can be rolled into a sheet of desired thickness, then cut into rectangular or square tiles, or punched into circular discs or other flat shapes.

There are various ways of embedding the optical elements into the shaped paste. For example, first the discs or tiles can be dried, and then buried in a bed of the optical elements and fired as described earlier for the frit flakes. The particles of the frit powder fuse together above the softening temperature of the glass and the optical elements surrounding the shaped core embed themselves into the core. As mentioned above, any volatiles present preferably are removed before the frit fuses and the cores preferably do not contact each other during firing or they may bond together.

One means of alleviating this problem is to coat the optical elements on the surfaces of the cores with a temporary binder prior to firing. The temporary organic binder helps insure that the optical elements completely surround the cores when they are buried in the optical element bed prior to firing. During firing the binder is volatilized.

Another way of embedding optical elements is to directly embed them into the shaped paste before drying or firing. The shaped paste cores can be gently tumbled in a bed of optical elements where they embed in the entire surface of the core. A column of paste may also be extruded and rolled in a layer of optical elements. When the column is later cut into discs or tiles, the optical elements will be located in the most desirable location for retroreflection. This method conserves the amount of optical elements required to effectively coat each element. Direct embedding of the optical elements into the paste requires control of the liquid content of the paste. If the paste is too dry the optical elements may not embed to the desired depth. If the paste is too damp it may be difficult to form the desired shapes without distortion. If the optical elements are directly embedded into the damp paste, the retroreflective elements do not have to be fired in a bed of excess optical elements. Moreover, cores with pre-embedded optical elements do not show a tendency to bond to each other during firing and do not tend to spheroidize. Pre-embedment provides a significant energy savings because the excess optical elements do not have to be heated to the process temperature. Also, the volume of material processed per unit time increases because the excess optical elements can be replaced by more retroreflective elements in the furnace.

The retroreflective elements of the present invention typically are substantially covered by optical elements. The surface of the retroreflective elements intended to retroreflect light preferably do not contain major portions that are void of optical elements. The optical elements are essentially close packed on the surfaces intended to retroreflect light.

In some instances, it may be desirable to reduce the concentration of optical elements embedded in the surfaces of the retroreflective element, perhaps to conserve the amount of optical elements used. For example, the cores may be fired in a mixed bed of optical elements and inert particles, such as zircon, of the same approximate size as the optical elements.

Ceramic optical elements can be relatively expensive; therefore, limiting the placement of optical elements to the vertical surfaces of the retroreflective elements where they are most effective is often desirable. This selective placement can be accomplished, as stated above, by extruding columns of frit-water paste, rolling the columns in the optical elements with sufficient force to embed them into the surface, and then dicing the columns into thin slices. However, this method is not practical for mass production.

Alternatively, a core formed from a thin sheet of the frit-water paste may be formed by extrusion or rolling. The sheet's top and bottom surfaces can be coated with a thin barrier layer of a powder which will not dissolve in the frit above the softening temperature.

The size of the powder varies and preferably is from about 1 micrometer to about 200 micrometer. Powders finer than about 1 micrometer are often expensive and difficult to coat. Powders larger than 200 micrometers can be difficult to adhere to the surface of the core without excessive binder. Coarse powders (i.e., about 50 to about 200 micrometers) may be advantageous because the monolayer of powder is sufficient to act as a barrier and each particle is embedded in the surface of the retroreflective element during firing which prevents dusting of excess powder after the firing operation.

Examples of powders which are effective include $Al_2O_3$, $SiO_2$, $TiO_2$, and $ZrSiO_4$. Cores can then be punched or diced from the coated sheet. The result is a thin disc or tile of the frit paste coated on the upper and lower flats where optical elements are not desired. When the dried parts are fired to a suitable temperature for optical element embedment in a bed of optical elements, the optical elements embed into the uncoated surfaces of the retroreflective elements, but not into the coated surfaces.

It is anticipated that liquid precursors which yield oxides during firing in air could also be used to form barrier layers which inhibit embedment of the optical elements. For example, silicone polymers might be used as precursors for silica, or solutions of aluminum compounds such as aluminum formoacetate, $Al(OH)(OOCH)(OOCCH_3)$, might be used as precursors for alumina.

The titania or zircon opacified glasses can be used in the conventional manner as a glaze or coating for another ceramic substrate, for example a shaped whiteware body or a skid-resistant particle. In this case the coating thickness of the glaze should allow for embedding of the optical elements to a depth of 30 to 80% of their average diameter, and preferably to a depth of 40 to 60% of their average diameter. The glaze may be applied as a slurry of frit and water by conventional techniques such as spraying or dip-coating. A preferred method of coating small objects such as skid-resistant particles is to first wet the particles with an aqueous solution of a polymeric binder, such as polyvinyl alcohol, and then mix the powdered frit into the wet particles until dry, free flowing, coated particles are obtained. The frit adheres to the wet particles and builds-up a surprisingly uniform coating until the liquid is fully contained in the pores of the coated frit.

Glass-ceramics are also available commercially in fritted form or as coarse powders (50 to 200 micrometers). These can be processed in the manner described above for opacified glass powders. Typically, the glass-ceramics will have higher softening temperatures than the glaze or enamel glasses which are specially designed to have low softening temperatures. Therefore generally, direct embedment of optical elements into a frit-water paste will be required.

Applications

The retroreflective elements of the present invention can be dropped or cascaded onto binders such as wet paint, thermoset materials, or hot thermoplastic materials (e.g., U.S. Pat. Nos. 3,849,351, 3,891,451, 3,935,158, 2,043,414, 2,440,584, and 4,203,878). In these applications, the paint or thermoplastic material forms a matrix that serves to hold the retroreflective elements in a partially embedded and partially protruding orientation. The matrix can be formed from durable two component systems such as epoxies or polyurethanes, or from thermoplastic polyurethanes, alkyds, acrylics, polyesters, and the like. Alternate coating compositions that serve as a matrix and include the retroreflective elements described herein are also contemplated to be within the scope of the present invention.

Typically, the retroreflective elements of the present invention are applied to a roadway or other surface through the use of conventional delineation equipment. The retroreflective elements are dropped from a random position or a prescribed pattern if desired onto the surface, and each retroreflective element comes to rest with one of its faces disposed in a downward direction such that it is embedded and adhered to the paint, thermoplastic material, etc. If different sizes of retroreflective elements are used, they are typically evenly distributed on the surface. When the paint or other film-forming material is fully cured, the retroreflective elements are firmly held in position to provide an extremely effective reflective marker.

The retroreflective elements of the present invention can also be used on preformed tapes used as pavement markings.

The following examples illustrate various specific features, advantages, and other details of the invention. The particular materials and amounts recited in these examples, as well as other conditions and details, should not be construed in a manner that would unduly limit the scope of this invention. Percentages given are by weight.

EXAMPLES

Example 1

This example demonstrates the effect of firing temperature on the opacity, brightness and depth of optical element embedment for retroreflective elements prepared using a zircon opacified glass frit powder.

Several small batches of paste prepared from the frit, methylcellulose, and water were combined for use in this example. The preparation and the formulations were similar for the various batches. The component amounts will be reported below as ranges to account for this variation. The following ingredients were mixed together in a double planetary mixer (amounts in grams ("g")):

| | |
|---|---|
| 200 g | FA233 zircon opacified glass frit (-200 mesh), Ferro Corp., Cleveland, OH |
| 6 to 14 g | A4M methylcellulose, Dow Chemical Company, Midland, MI |
| 0 to 6 g | Carbowax ™ PEG 20,000, Union Carbide, Danbury, CT |
| 65 to 90 g | Water |

The glass frit and methylcellulose were dry blended for 5 minutes. The water was added in small increments with 5 minutes of mixing after each water addition to form the paste. The Carbowax™ PEG 20,000 was added with the first increment of water when it was part of the formulation. Carbowax was added in some cases to reduce the tendency of a paste to stick to forming materials. The combined paste from several different batches was rolled to a thickness of approximately 4 millimeters ("mm") on a sheet of polyester film using a rolling pin. The sheet was cut into tiles 5 mm square using a hand roll with parallel blades, cu ting first in one direction and then perpendicular to the original direction. The paste tiles remained attached to the polyester sheet during cutting and the blades did not penetrate this sheet, allowing the sheet to serve as a carrier during drying. The cut sheet was dried for about 30 minutes at 80° C. in a mechanical convection oven or dried at room temperature overnight. Later the individual tiles were separated from the polyester carrier.

The tiles were buried in clear ceramic optical elements having a refractive index of 1.75. Various methods of manufacturing these elements are available such as described in Example 4 of U.S. Pat. No. 4,564,556. In that Example, a stable, ion-exchanged zirconia sol was prepared by mixing a nitrate stabilized zirconia sol containing about 20% $ZrO_2$ by weight and about 0.83M $NO_3$ per mole $ZrO_2$ (obtained from Nyacol Products Company), with an ion exchange resin (Amberlyst A-21 resin made by Rohm and Haase Company) in a ratio of about 100 g of sol to 15 g resin. To about 21 g of the resulting stable zirconia sol were added about seven grams of silica sol (Ludox LS), and then about 2.5 g of a 50% aqueous ammonium acetate solution were added to the sol with agitation. The resulting mixture (having a $ZrO_2$:$SiO_2$ mole ratio of about 1:1) was immediately added to 500 ml of 2-ethylhexanol under agitation in a 600 ml beaker. After stirring for about five minutes, the mixture was filtered to separate the gel particles from the alcohol. Very transparent, rigid gelled spheres up to and exceeding 1 mm in diameter were recovered. These particles were dried and subsequently fired to 1000° C. Intact, transparent to slightly translucent spheres up to and over 500 micrometers in diameter were obtained.

The tiles were arranged and buried in the optical elements to minimize contact so that the formation of clusters was minimal. The optical elements were contained in a high purity $Al_2O_3$ boat. The boat containing the optical elements and tiles was then fired in air according to the following schedule:

22° C. to X° C. at 3.6° C./min.

X° C. soak for 60 min.

X° C. to 22° C. at 3.6° C./min.

where X equals to 881° C., 907° C., 936° C., 960° C., 984° C., 1014° C., and 1041° C.

The results at the different firing temperatures are reported in the following table.

| Sample # | Temperature (° C.) | Opacity/Brightness | Optical Element Embedding Depth |
|---|---|---|---|
| A | 1041 | Not Good | Too Far |
| B | 1014 | Similar to A | Similar to A |
| C | 984 | Better than B | about 50% |
| D | 960 | Better than C - Good | about 50% |
| E | 936 | Similar to D - Good | about 50% |
| F | 907 | Slightly Better Than E - Best | about 50% |
| G | 881 | Between C & D | about 33% to 50% |

Example 2

This example demonstrates the effect of burying depth during firing on the embedment of optical elements and on the shape of the fired retroreflective element.

The following ingredients were mixed by hand to form a paste:

| | |
|---|---|
| 60 g | FA 233 zircon opacified glass frit (-200 mesh), Ferro Corp., Cleveland, OH |
| 25 g | 5 wt % polyvinyl alcohol (Airvol ™ 205, Air Products and Chemicals, Inc., Allentown, PA) in water |

A plastic grid (3.2 mm thick) containing an array of 6.4 mm square openings was attached to the top of a glass plate to form a mold for square tiles. The paste was squeezed into the openings with a trowel, then dried at 22° C. overnight under a stream of flowing air. Once dried, after removing the glass plate, the paste squares were pushed out of the mold.

Four molded tiles were buried in clear ceramic optical elements having a refractive index of 1.75 (as described in Example 1). The tiles were buried at different depths in the optical elements ranging from less than 2 mm to about 5 cm. The optical elements were contained in a high purity $Al_2O_3$ boat. The boat containing the optical elements and tiles was then fired in air according to the following schedule:

22° C. to 800° C. at 16.2° C./min.

800° C. soak for 10 min.

800° C. to 22° C. at 16.2° C./min.

Part 1 was covered with less than 2 mm of optical elements during firing. After firing this part was rounded almost to a hemisphere on top, but retained a flat square shape on the bottom, except for some rounding of the sharp edges. The optical elements were embedded to a depth of about 10% of their diameter on the top of this retroreflective element and to about 33% on the bottom. Parts 2, 3, and 4 were buried at depths of about 1.8 cm, 3.4 cm, and 5.0 cm. They all retained their square shape with the exception of some rounding of the sharp edges. The depth of optical element embedment in these retroreflective elements was about 33%.

Example 3

This example demonstrates making a retroreflective element using a paste made from zircon opacified glass frit powder to form the core material.

The following ingredients were mixed together in a double planetary mixer:

| | |
|---|---|
| 200 g | FA233 zircon opacified glass frit (−200 mesh), Ferro Corp., Cleveland, OH |
| 12 g | A4M methylcellulose, Dow Chemical Company, Midland, MI |
| 66 g | water |

The glass frit and methylcellulose were dry blended for 5 to 10 min. The water was added to the dry blend as ice and mixing was continued for 10 to 15 min. to form the paste. The water was added in the form of ice to assist in solution of the methylcellulose which has a higher solubility in cold water. During mixing, the ice melts and dissolves the methylcellulose. The paste was then sandwiched between two sheets of polyester film and pulled through a two roll mill with counter-rotating steel rollers, 7.6 mm diameter. and rotating at 12 rpm. The rollers had a fixed gap which was set at 0.9 mm. After rolling, the top sheet of polyester film was gently pulled off the paste sheet. The sheet was cut into tiles 5 mm square using a hand roll with parallel blades, cutting first in one direction and then perpendicular to the original direction. The paste tiles remained attached to the lower polyester sheet during cutting and the blades did not penetrate this sheet. This allowed the lower sheet to serve as a carrier during drying. The paste was dried for about 45 min. at 125° C. in a mechanical convection oven, after which the individual tiles were separated from the polyester carrier.

The tiles were buried in clear ceramic optical elements having a refractive index of 1.75 (as described in Example 1). The tiles were arranged and buried in the optical elements to minimize contact so that the formation of multi-element clusters was minimal. The optical elements were contained in a high purity $Al_2O_3$ boat. The boat containing the optical elements and tiles was then fired in air according to the following schedule:

22° C. to 903° C. at 3.6° C./min.
903° C. soak for 60 min.
903° C. to 22° C. at 3.6° C./min.

The optical elements were embedded from 33% to 50% of their average diameter in the zircon opacified glass core.

When observed in a flashlight beam, the cores reflected brightly from a wide range of viewing angles.

Example 4

This example demonstrates adhering optical elements to the core of the retroreflective element prior to firing.

A paste was prepared from a zircon opacified glass frit, as in Example 3, and then rolled into a sheet and cut into tiles as described in Example 3. After drying for 45 min. at 125° C. in a mechanical convection oven, the tiles were sprayed on all sides with ReMount™ Repositionable Adhesive, 3M Company, St. Paul, Minn. Clear ceramic optical elements having a refractive index of 1.75 (as described in Example 1) were sprinkled on the coated tiles. The tiles were then placed in a pile on top of a bed of the ceramic optical elements contained in a high purity $Al_2O_3$ boat. The boat containing the optical elements and tiles was then fired in air according to the following schedule:

22° C. to 1000° C. at 20.0° C./min.
1000° C. soak for 10 min.
1000° C. to 22° C. at 20.0° C./min.

Most of the optical elements were embedded from 50% to 66% of their average diameter in the zircon opacified glass core. When observed in a flashlight beam, the parts reflected in a similar way as those of Example 3 from a wide range of viewing angles.

Example 5

This example demonstrates embedding optical elements into the core of the retroreflective element prior to firing.

A paste was prepared from a zircon opacified glass frit, as in Example 3, and then rolled into a sheet and cut into tiles as described in Example 3. The wet paste tiles were then dropped into a glass jar that contained clear ceramic optical elements having a refractive index of 1.75 (as described in Example 1). The jar was then rotated by hand for about 25 to 30 revolutions in order to embed the optical elements in the wet paste tiles. The tiles were then separated from the excess optical elements. The tiles were placed in a pile on top of a bed of the optical elements contained in a high purity $Al_2O_3$ boat. The boat containing the optical elements and tiles was then fired in air according to the following schedule:

22° C. to 1005° C. at 20.1° C./min.
1005° C. soak for 10 min.
1005° C. to 22° C. at 20.1° C./min.

Most of the optical elements were embedded to about half of their diameter in the zircon opacified glass core. Some of the optical elements embedded too far in the core. When observed in a flashlight beam, the parts reflected in a similar way as those of Example 3 from a wide range of viewing angles.

Example 6

This example demonstrates making a reflective element using a zircon opacified glass frit powder that has been formed into spherical agglomerates using disc pelletization.

FA233 zircon opacified glass frit (−200 mesh), Ferro Corp., Cleveland, Ohio, was processed into micropellets at FERRO-TECH using the following procedure. The glass frit was mixed with 8 wt % Brewex (a water soluble binder available from Anheuser-Busch Companies, Inc., Houston, Tex.) in a Batch Turbulator (Model 12TB34 from FERRO-TECH, Wyandotte, Mich.) for 18 seconds. This powder mixture was then hand fed into a Disc Pelletizer (Model 024" 2'0" from FERRO-TECH) and water was sprayed onto the powder at a 4:30/6:30 position. The resulting micropellets were removed by hand and dried in a convection oven at 121.1° C. The micropellets were screened to a size of −5, +10 mesh (2–4 mm).

The micropellets were buried in clear ceramic optical elements having a refractive index of 1.75 (as described in Example 1). The micropellets were arranged and buried in the optical elements in a manner to try and minimize contact so that the formation of clusters would be minimal. The optical elements were contained in a high purity $Al_2O_3$ boat. The The boat containing the optical elements and micropellets was then fired in air according to the following schedule:

22° C. to 1010° C. at 20.2° C./min.

1010° C. soak for 10 min.

1010° C. to 22° C. at 20.2° C./min.

The optical elements were embedded from 33% to 50% of their diameter in the zircon opacified glass core. When observed in a flashlight beam, the parts reflected in a similar way to those of Example 3 from a wide range of viewing angles.

Example 7

This example demonstrates making retroreflective elements using a sized zircon glass frit chip as the core material.

Retroreflective elements were prepared using a zircon opacified glass frit chip classified to have a size range of −5, +10 mesh (2 to 4 mm) and designated as CZ110 from Ferro Corp., Cleveland, Ohio, as the core material. The glass frit chips were buried in clear ceramic optical elements having a refractive index of 1.75 (as described in Example 1). The chips were arranged and buried in the optical elements to minimize contact so that the formation of chip clusters was minimal. The optical elements were contained in a high purity $Al_2O_3$ boat. The boat containing the optical elements and chips was then fired in air according to the following schedule:

22° C. to 984° C. at 3.6° C./min.

984° C. soak for 60 min.

984° C. to 22° C. at 3.6° C./min.

The optical elements were embedded from 33% to 50% of their diameter in the zircon opacified glass core.

Example 8

This example demonstrates making retroreflective elements using a sized titania opacified glass frit flake as the core material.

Retroreflective elements were prepared using a titania opacified glass frit flake, designated as Neo-686x available from Bayer Corp., Baltimore, Md., as the core material. The glass frit flakes were buried in clear ceramic optical elements having a refractive index of 1.75 (as described in Example 1). The flakes were arranged and buried in the optical elements to minimize contact so that the formation of clusters was minimal. The optical elements were contained in a high purity $Al_2O_3$ boat. The boat containing the optical elements and flakes was then fired in air according to the following schedule:

22° C. to 735° C. at 18.3° C./min.

735° C. soak for 10 min.

735° C. to 22° C. at 18.3° C./min.

The optical elements were embedded to about half of their diameter in the titania opacified glass core. When observed in a flashlight beam, the parts reflected better than the zircon opacified elements of Example 7 from a wide range of viewing angles.

Example 9

This example demonstrates making a reflective element using a paste made from titania opacified glass frit powder to form the core material.

The following ingredients were mixed together in a double planetary mixer:

800 g Neo-686x titania opacified glass frit (−325 mesh), Bayer Corp., Baltimore, MD 48 g A4M methylcellulose, Dow Chemical Company, Midland, MI 264 g Water The glass frit and methylcellulose were dry blended about 10 min. The water was added to the dry blend as ice and mixing was continued for 15 to 20 min. to form the plastically deformable paste. The paste was then formed into a core by sandwiching the paste between two sheets of polyester film and pulled through a two roll mill with counter-rotating steel rollers, 7.6 mm diameter. and rotating at 12 rpm. The rollers had a fixed gap which was set at 0.9 mm. After rolling the top sheet of polyester film was gently pulled off the paste sheet. The sheet was cut into the desired shape, or into tiles 5 mm square using a hand roll with parallel blades, cutting first in one direction and then perpendicular to the original direction. The paste tiles remained attached to the lower polyester sheet during cutting and the blades did not penetrate this sheet. This allowed the lower sheet to serve as a carrier during drying. The paste was dried for about 30 min. at 80° C. in a mechanical convection oven, after which the individual tiles were separated from the polyester carrier.

The tiles were buried in clear ceramic optical elements having a refractive index of 1.75 (as described in Example 1). The tiles were arranged and buried in the optical elements to minimize contact so that the formation of clusters was minimal. The optical elements were contained in a high purity $Al_2O_3$ boat. The boat containing the optical elements and tiles was then fired in air according to the following schedule:

22° C. to 745° C. at 18.5° C./min.

745° C. soak for 10 min.

745° C. to 22° C. at 18.5° C./min.

The optical elements were embedded to about half of their diameter in the titania opacified glass core.

Example 10

This example demonstrates how selective optical element placement on a retroreflective element can be achieved using a coating of a powder which inhibits embedding of the optical elements during firing A. Selective optical element placement on opacified zircon glass cores using $Al_2O_3$ or $SiO_2$ powder.

Unfired square tiles (6.4 mm×6.4 mm×2.7 mm) of zircon opacified glass frit were prepared as described in Example 2. Prior to removing the tiles from the mold some of them were coated with either a thin layer of $Al_2O_3$ powder (HPA-0.5, 0.5 micrometer average particle size, Ceralox Corp., Tucson, Ariz.) or $SiO_2$ powder (Min-U-Sil 5, 1.6 micrometer average particle size, U.S. Silica Company, Berkeley Springs, W. Va.) on the top and bottom faces. The coating was applied by lightly brushing a slurry of the $Al_2O_3$ and ethanol, or $SiO_2$ and ethanol, on to the faces of the tile with a small paint brush. The coatings were dried at room temperature with air flowing over them. The coated tiles were removed from the mold with a wood punch. The resulting tiles were coated on the top and bottom faces with either $Al_2O_3$ or $SiO_2$ while the vertical surfaces were uncoated. The tiles were buried in clear ceramic optical elements having a refractive index of 1.75 (as described in Example 1). The tiles were arranged and buried in the optical elements to minimize contact so that the formation of clusters was minimal. The optical elements were contained in a high purity $Al_2O_3$ boat. The boat containing the optical elements and tiles was then fired in air according to the following schedule:

22° C. to 800° C. at 16.2° C./min.

800° C. soak for 10 min.

800° C. to 22° C. at 16.2° C./min.

After firing the coated parts had optical elements embedded to about half their diameter on the four uncoated sides, while optical elements were not embedded in the areas that were coated with either the $Al_2O_3$ or the $SiO_2$. When observed in a flashlight beam, the parts reflected in a similar way to those of Example 3 from a wide range of viewing angles.

B. Selective optical element placement on opacified titania glass cores using $TiO_2$ powder.

Unfired square tiles (5 mm×5 mm×1.5 mm) were prepared following the procedures described in Example 9. A slurry was prepared from titania powder (R-900, Average particle size 0.3 micrometers, E. I. DuPont De Nemours & CO., Wilmington, Del.) and a binder solution composed of 17 wt % poly(2-ethyl-2-oxazoline) (Aquazol 200, Polymer Chemistry Innovations, Inc., State College, Pa.), 3 wt % polyethylene glycol (Polyglycol E400, Dow Chemical Co., Midland, Mich.) and ethanol. The slurry was painted on the faces of the tiles using a small paint brush and allowed to dry.

The tiles were buried in clear ceramic optical elements having a refractive index of 1.75 (as described in Example 1). The tiles were arranged and buried in the optical elements in a manner that minimized contact so that the formation of clusters was minimal. The optical elements were contained in a high purity $Al_2O_3$ boat. The boat containing the optical elements and tiles was then fired in air according to the following schedule:

22° C. to 725° C. at 18.5° C./min.

725° C. soak for 10 min.

725° C. to 22° C. at 18.5° C./min.

After firing the optical elements were embedded in the vertical surfaces of the tiles, but not in the faces of the tile which had been coated with the titania powder.

C. Selective optical element placement on opacified titania glass cores using coarse $Al_2O_3$ powder.

Unfired square tiles (5 mm×5 mm×1.5 mm) were prepared following the procedures described in Example 9. A binder solution composed of 17 wt % poly(2-ethyl-2-oxazoline) (Aquazol 200, Polymer Chemistry Innovations, Inc., State College, Pa.), 3 wt % polyethylene glycol (Polyglycol E400, Dow Chemical Co., Midland, Mich.) and ethanol was painted on the faces of the tiles using a small paint brush. A coarse, free flowing $Al_2O_3$ powder was poured over the painted binder before it dried. The $Al_2O_3$ powder was Fused White Alpha Alumina (C-E Minerals, Andersonville, Ga.) which had been screened to -100, +200 mesh (75-150 micrometers). Excess powder was removed from the coated tiles and they were allowed to dry.

The tiles were buried in clear ceramic optical elements having a refractive index of 1.75 (as described in Example 1). The tiles were arranged and buried in the optical elements in a manner that minimized contact so that the formation of clusters was minimal. The optical elements were contained in a high purity $Al_2O_3$ boat. The boat containing the optical elements and tiles was then fired in air according to the following schedule:

22° C. to 570° C. at 18.5° C./min.

570° C. soak for 15 min.

570° C. to 745° C. at 18.5° C./min.

745° C. soak for 10 min.

745° C. to 22° C. at 18.5° C./min.

After firing the optical elements were embedded in the vertical surfaces of the tiles, but not in the faces of the tile which had been coated with the alumina powder.

Example 11

This example compares the strength and reflectivity of different ceramic core candidates.

A. Zircon Opacified Glass

The following ingredients were mixed together in a double planetary mixer:

| | |
|---|---|
| 200 g | FA233 zircon opacified glass frit (-200 mesh), Ferro Corp., Cleveland, OH |
| 12 g | A4M methylcellulose, Dow Chemical Company, Midland, MI |
| 85 g | Water |

The glass frit and methylcellulose were dry blended for 5 min. Water was added in four 20-g increments and one 5-g increment, with 5 min. of mixing following each water addition.

The dough-like paste resulting from the above mixing was rolled into a thin sheet approximately 2 mm thick with a rolling pin. The rolling pin had a band of masking tape wrapped around each end to a height of 2 mm. This provided a means for forming a sheet of uniform thickness. Discs approximately 1 cm in diameter were punched from the paste sheet using a No. 8 cork boring tool.

The discs were dried at 80° C. for 1 hr in a mechanical convection oven. Then the discs were buried in clear ceramic optical elements having a refractive index of 1.75 (as described in Example 1). The optical elements were contained in a high purity $Al_2O_3$ boat. The boat containing the optical elements and discs was then fired in air according to the following schedule:

22° C. to 970° C. at 18.6° C./min.

970° C. soak for 10 min.

970° C. to 22° C. at 18.6° C./min.

The optical elements were embedded to about half of their diameter in the opacified glass core.

B. Titania Opacified Glass

The following ingredients were mixed together in a double planetary mixer:

| | |
|---|---|
| 800 g | Neo-686x opacified glass frit (-325 mesh), Bayer Corp., Baltimore, MD |
| 48 g | A4M methylcellulose, Dow Chemical Company, Midland, MI |
| 264 g | Water (as ice) |

The glass frit and methylcellulose were dry mixed for 10 min., then the water, in the form of crushed ice, was added and the ingredients were mixed for 15 min.

The paste was rolled into a 2 mm thick sheet and discs were punched from the sheet as described above in Part A.

The discs were dried at 80° C. for 1 hr in a mechanical convection oven. Then the discs were buried in clear ceramic optical elements having a refractive index of 1.75 (as described in Example 1). The optical elements were contained in a high purity $Al_2O_3$ boat. The boat containing the optical elements and discs was then fired in air according to the following schedule:

22° C. to 735° C. at 16.1° C./min.

735° C. soak for 10 min.

735° C. to 22° C. at 16.1° C./min.

The optical elements were embedded to about half of their diameter in the opacified glass core.

C. Cordierite Glass-ceramic

The following ingredients were mixed by hand in a small beaker with a spatula:

| 10 | g | SP980 cordierite glass-ceramic frit (−325 mesh), Specialty Glass Company, Oldsmar, FL |
| 3.6 | g | 10 wt % aqueous solution of polyvinyl alcohol, AIRVOL 205, Air Products & Chemicals, Inc., Allentown, PA |

The resulting paste was rolled into a 2 mm thick sheet and discs were punched from the sheet as described above in Part A.

The discs were dried 16 hr at room temperature, then at 80° C. for 1 hr in a mechanical convection oven. Then the discs were buried in clear ceramic optical elements having a refractive index of 1.75 (as described in Example 1). The optical elements were contained in a high purity $Al_2O_3$ boat. The boat containing the optical elements and discs was then fired in air according to the following schedule:

22° C. to 900° C. at 8.1° C./min.
900° C. soak for 60 min.
900° C. to 950° C. at 8.3° C./min.
950° C. soak for 60 min.
950° C. to 22° C. at 15.5° C./min.

The optical elements were embedded to only about 10 to 20% of their diameter in the glass-ceramic core.

Strength Measurements

The ability of a ceramic core to resist crushing by vehicle traffic is a concern. While a direct measure of the crushing strength would be desirable, the process used to make the core materials lends itself better to the preparation of small flat discs which can be used to measure the biaxial tensile strength. Because the compressive strength of a ceramic is generally 10 times the tensile strength, relative tensile strengths should correspond well to relative crushing strengths.

Five discs of each core material were ground flat and to a thickness of about 1 mm using a lapping fixture (Model 104, Southbay Technology, Inc., Temple City, Calif.) and 30 micron diamond film (3M, St. Paul, Minn.). The sides of each disc were ground until they were flat and until any ceramic optical elements embedded in the disc during firing were removed from the surface.

The biaxial tensile strength of each disc was measured using a procedure similar to that described by D. J. Godfrey, *Mat. Sci. & Tech.*, Vol. 1, pp. 510–515, 1985.

In the test, the disc is supported by 3 steel balls near the perimeter, force is applied until fracture occurs by a single steel ball above the disc. The test fixture used 3 steel balls (3.2 mm dia.) arranged with their centers on a diameter of 7.6 mm to support the disc. Force was applied by a single steel ball (6.4 mm dia.). The force required to fracture each disc was measured on a universal testing machine (Model 1101, ATS, Inc., Butler, Pa.). The average strength obtained for each core candidate is listed below:

| Sample | Strength (MPa) |
|---|---|
| Zircon Opacified Glass | 156 |
| Titania Opacified Glass | 120 |
| Cordierite Glass - ceramic | 142 |

Reflectivity Measurements

The reflectance factor of each candidate disc was measured with a densitometer in the reflective mode (Model TR-927, Macbeth, Newburgh, N.Y.) following procedures described in ANSI Standard PH2. 17-1985. Samples were prepared by lapping one disc of each core material to a thickness of about 500 microns using a lapping fixture (Model 150, Southbay Technology, Inc., Temple City, Calif.) and 30 micron diamond lapping film (3M, St. Paul, Minn.). The surfaces were further polished with 15 micron diamond lapping film (3M, ST. Paul, Minn.) and 3 micron diamond slurry (Buehler, Lake Bluff, Ill.). The reflectivity of each disc was measured over an absorbing black background with a reflective density greater than 1.5. This prevented any light able to penetrate the sample from being reflected back to the detector by the background. The reflectance factor for each material is presented in the following table:

| Sample | Reflectance Factor (%) |
|---|---|
| Zircon Opacified Glass | 75.9 |
| Titania Opacified Glass | 87.1 |
| Cordierite Glass - ceramic | 61.7 |

The high reflectivity of the titania and zircon opacified glasses can be related to the high refractive indices of the titania and zircon opacifying crystals in these materials. The glass-ceramic contains cordierite crystals in a glass of similar composition so the difference in refractive index is not as great.

Example 12

Retroreflective elements were prepared using the same core materials evaluated in Example 11. Retroreflective measurements conducted on these retroreflective elements were then related back to the values obtained for the reflectance factors in Example 11.

A. Zircon Opacified Glass

These retroreflective elements were prepared as described in Example 3.

B. Titania Opacified Glass

These retroreflective elements were prepared as described in Example 9.

C. Cordierite Glass-Ceramic

Mechanical embedment of the optical elements into the surface of the unfired cores was necessary for the glass-ceramic cores. The viscosity of the glass was not low enough at the firing temperature to permit embedding by capillary forces. Since the retroreflective measuring technique only required optical elements on one side of the retroreflective element a simplified process was employed to make these samples.

The following ingredients were mixed together in a double planetary mixer:

| 150 | g | SP980 cordierite glass-ceramic frit (−325 mesh), Specialty Glass Company, Oldsmar, FL |
| 9.0 | g | A4M methylcellulose, Dow Chemical Company, Midland, MI |
| 49.5 | g | Water (as ice) |

The glass frit and methylcellulose were dry mixed for 10 min., then the water, in the form of ice, was added and the ingredients were mixed for 15 min.

A small amount of the paste was flattened by hand and then placed between three sheets of polyester film, one above and two below the paste. The extra film layer below the paste provides 50 microns of space so that on the second pass through the rolls to embed the optical elements they are not driven quite so deeply into the paste. The surfaces of the film which were in contact with the paste had been coated with a silicone release agent to prevent sticking (Silicone Spray Parting Agent No. S512, IMS Co., Cleveland, Ohio). The paste and the polyester liners were then drawn through a pair of counter-rotating steel rollers, 7.6 mm dia., 12 rpm. The rollers had a fixed gap which was set at 0.9 mm. After rolling the top film and the lower spacer film were removed from the paste. The upper layer of film was replaced by a sheet of polyester film which had been coated on one side with clear ceramic optical elements having a refractive index of 1.75 (as described in Example 1). The optical elements were coated on the film using a repositionable adhesive (Remount No. 6091, 3M Co., St. Paul, Minn.) which was sprayed over the surface. Optical elements were poured over the surface of the adhesive until it was thoroughly coated. The side of the sheet coated with optical elements was placed in contact with the rolled paste. The paste and films were then drawn through the rollers a second time with the same gap. The polyester liner which had been coated with optical elements was removed from the paste leaving a monolayer of optical elements partially embedded in the paste, to a depth of about 50 to 60% of their average diameter. The paste sheet was cut into tiles 5 mm square using a hand roll with parallel blades, cutting first in one direction and then perpendicular to the original direction. The paste remained attached to the lower polyester sheet during cutting and the blades did not penetrate this sheet. This allowed the lower sheet to serve as a carrier during drying.

The tiles were dried at room temperature for 64 hr, after which the individual tiles were separated from the polyester carrier. Then the tiles were buried in clear ceramic optical elements having a refractive index of 1.75 (as described in Example 1). The optical elements were contained in a high purity $Al_2O_3$ boat. The boat containing the optical elements and tiles was then fired in air according to the following schedule:

22° C. to 900° C. at 8.1° C./min.
900° C. soak for 60 min.
900° C. to 950° C. at 8.3° C./min.
950° C. soak for 60 min.
950° C. to 22° C. at 15.5° C./min.

The optical elements were embedded to about 33 to 50% of their diameter on the side of the retroreflective element in which they were mechanically embedded. On the other sides the optical elements were only embedded to about 10 to 20% of their diameter and were easily removed.

Retroreflection Measurements

The coefficient of retroreflection ($R_A$), following Procedure B of ASTM Standard E809-94a, was measured at an entrance angle of −4.0 degrees and an observation angle of 0.5 degrees. The photometer used for these measurements is described in U.S. Defensive Publication No. T987,003. Retroreflective elements of each type, described in sections A to C of this example, were attached to an white index card using a double sided adhesive tape. The retroreflective elements were arranged in a monolayer, laying flat, packed together as tightly as possible. Another card with a 4 cm dia. hole was placed over the monolayer of retroreflective elements as a shield such that only the retroreflective elements showing through the hole were exposed to the incident light. For comparison purposes a white index card was measured to indicate a baseline for a diffuse reflector which exhibits no retroreflective properties.

| Sample | $R_A$/(candela/lux/meter$^2$) |
|---|---|
| Titania Opacified Glass | 3.8 |
| Zircon Opacified Glass | 1.8 |
| Cordierite Glass - ceramic | 0.6 |
| White Index Card | 0.3 |

The cordierite glass-ceramic retroreflective elements exhibit a relatively small retroreflective response, this indicates that the diffuse reflectivity of this material, as measured in Example 11, is just adequate to produce a working retroreflective element. The retroreflective performance, as indicated by the $R_A$ values. is improved by a factor of 3 with the zircon opacified glass which has a reflectance factor of 75.9%; and a factor of 6 for the titania opacified glass which has a reflectance factor of 87.1%. Accordingly, it is preferred that the core material have a reflectance factor above 75%, a most preferred value would be above 85%.

Example 13

This example demonstrates coating optical elements on skid-resistant particles using an opacified glass as a glaze.

Retroreflective elements were prepared using skid-resistant particles ($Al_2O_3$ particles sintered together with a glass flux) as the core material. The skid-resistant particles were made generally according to procedures described in U.S. Pat. No. 4,937,127. They are available from Diamonite Products, Shreve, Ohio, under the trade name Diamonite A-1100. The surfaces of the skid-resistant particles were coated with a 5 wt % aqueous solution of Airvol 205 Polyvinyl Alcohol (available from Air Products and Chemicals, Inc., Allentown, Pa.). FA233 zircon opacified glass frit (−200 mesh), Ferro Corp., Cleveland, Ohio, was coated over the wet skid-resistant particles. The glass frit was added in small amounts while hand mixing until all individual particles were completely coated with the glass frit. The coated cores were dry and free flowing. The coated cores were screened to −18 mesh.

The coated cores were buried in ceramic optical elements having a refractive index of 1.75 (as described in Example 1). The coated cores were arranged and buried buried in the optical elements to minimize contact so that the formation of clusters was minimal. The optical elements were contained in a high purity $Al_2O_3$ boat. The boat containing the optical elements and the coated cores were then fired in air according to the following schedule.

22° C. to 800° C. at 16.2° C./min.
800° C. soak for 10 min.
800° C. to 22° C. at 16.2° C./min.

The fired coated cores were roughly spherical in shape. They had 75–85% of their surface embedded with optical elements. About 50–60% of the optical elements were embedded to at least half of their diameter. When observed in a flashlight beam, the coated cores reflected brightly from a wide range of viewing angles.

Example 14

This example demonstrates making a retroreflective element optionally having skid-resistant particles through the use of a mold.

A hemisphere-shaped silicone mold (Silastic J, Dow Corning, Midland Mich.) was modified by punching 1.5 millimeter holes through the center and bottom of each of the 20 cavities. A 3 millimeter thick sheet of smooth silicone was cast and cured for the base sheet of the molding assembly.

Part 1 was made by sprinkling skid-resistant particles (120 grit SiC, Norton Co., Worchester, Mass.) into the hemisphere-shaped mold and then flood coating each cavity with optical elements (as described in Example 1). Excess optical elements and SiC grit were poured out so that only a monolayer of optical elements coated the hemispherical surface of the mold and the skid-resistant particles filled the hole and lined the sides of the hemispherical mold. The cavity was then filled (approximately 50 milliliters) with cordierite glass-ceramic material prepared as described below.

A 2600 cubic centimeter porcelain ball mill (U.S. Stoneware Co., Wayne, N.J.) was charged with 1400 grams of alumina grinding media (1.5 centimeter average diameter, from U.S. Stoneware Co.). About 300 grams of cordierite glass powder (−325 mesh, SP 980 from Specialty Glass Co., Oldsmar, Fla.) was added to the mill. About 6 grams of corn oil, 500 grams of toluene, 22.4 grams of Carbowax™ PEG 2000 (from Union Carbide, Danbury, Conn.) and about 37.3 grams of dioctyl phthalate (Aldrich Chemical Co., Milwaukee, Wis.) were then added. The mixture was ball milled for approximately 3 hours. Then, about 32.2 grams of Butvar B76 (polyvinyl butyral from Aldrich Chemical Co., Milwaukee, Wis.) was added to the mixture and the entire mixture was ball milled for an additional 3 hours.

The mixture in the mold was then vacuum de-aired for one minute at 28 inches (710 mm) of Hg vacuum (Alcatel 113 vacuum pump from Citcom Systems Inc., Hingham, Mass.). The molded mixture was then air dried over night, and released from the mold by simple flexure of the mold.

The resulting retroreflective elements were then placed in a 3 inch×6 inch (7.6×15.2 centimeter) alumina tray and fired to 900° C. by the following schedule:

Room temperature (approximately 25° C.) to 350° C. at 1° C./minute

350° C. soak for one hour

350° C. to 900° C. at 1° C./minute

900° C. soak for one hour cooled to room temperature overnight.

The retroreflective elements had skid-resistant particles on the top and side surfaces. The optical elements were embedded from 50 to 60% of their average diameter in the core.

Part 2 was made by coating lines of skid-resistant particles (SiC grit from Norton Co., Worchester, Mass.) onto the clean, smooth base silicone layer so that the line spacing matched the spacing of the holes in the hemispherical mold, approximately 6.3 millimeters. The SiC grit adhered to the silicone sheet and the punched hemispherical mold pattern was indexed to the line spacing on the base sheet. The top and bottom half of the mold naturally adhered silicone to silicone in the flat smooth areas of the bottom sheet and the flat areas between the punched holes in the top mold. The sealed hemispherical mold was filled with the mixture discussed in Part 1, and then dried, removed, and fired as described in Part 1. This retroreflective element had skid-resistant particles only on the top surface. The optical elements were embedded from 50 to 60% of their average diameter in the core.

Retroreflective elements can be made in similar manners without skid-resistant particles.

Example 15

This example demonstrates forming retroreflective elements by pelletization (or pilling).

Optical elements (as described in Example 1) were sprinkled on a silicone spray coated glass dish (petri dish available from Corning Glass Works, Corning, N.Y.). Droplets, approximately 5 millimeters in diameter, of the mixture described in Example 14 were dropped onto the rotating dish, layered with optical elements. The optical elements embedded into the surface of the samples. The resulting retroreflective elements were air dried overnight and then fired in accordance with Example 14. The optical elements were embedded to about 40% of their average diameter into the core.

Various modifications and alterations of this invention will become apparent to those skilled in the art without departing from the scope and spirit of this invention, and it should be understood that this invention is not to be unduly limited to the illustrative embodiments set forth herein.

What is claimed is:

1. A method of selectively embedding optical elements on an opacified ceramic core, said core having surfaces, comprising the steps of:

a) coating said core surfaces where optical elements are not desired with a barrier layer of powder; and b) heating the core while buried in a bed of optical elements to a temperature suitable for optical element embedding.

2. The method according to claim 1 wherein said powder is selected from the group consisting of $Al_2O_3$, $SiO_2$, $ZrSiO_4$, and $TiO_2$.

* * * * *